Figure 1:
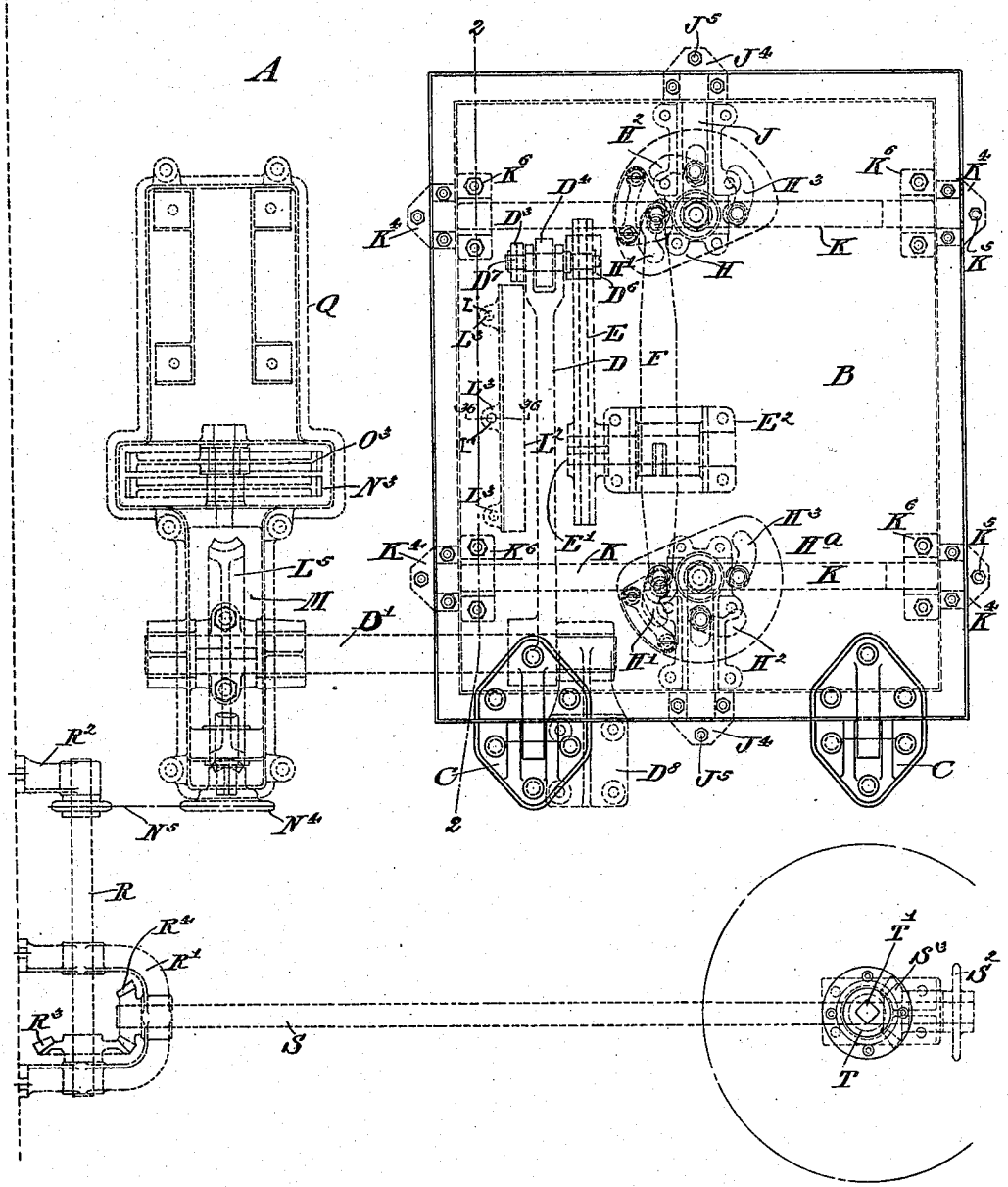

L. D. LOVEKIN, P. M. YOUNG & H. KRAPP.
HATCH COVER AND OPERATING MEANS THEREFOR.
APPLICATION FILED AUG. 31, 1906. RENEWED OCT. 12, 1909.

941,526.

Patented Nov. 30, 1909.

7 SHEETS—SHEET 2.

Fig. 2.

WITNESSES:

INVENTORS:
Luther D. Lovekin, Philip M. Young
and Hugo Krapp by

ATTORNEY.

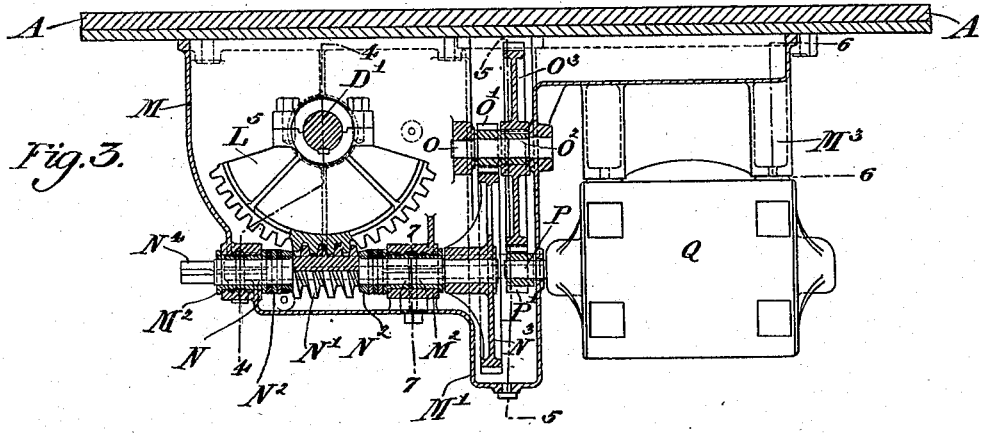
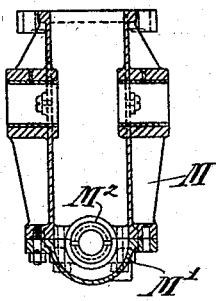
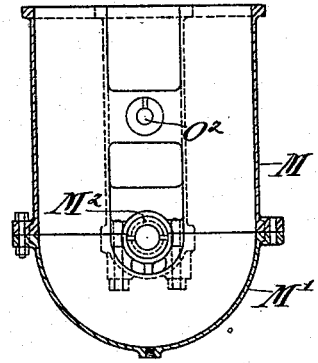
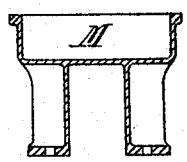
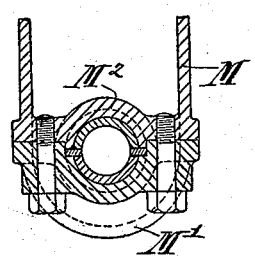

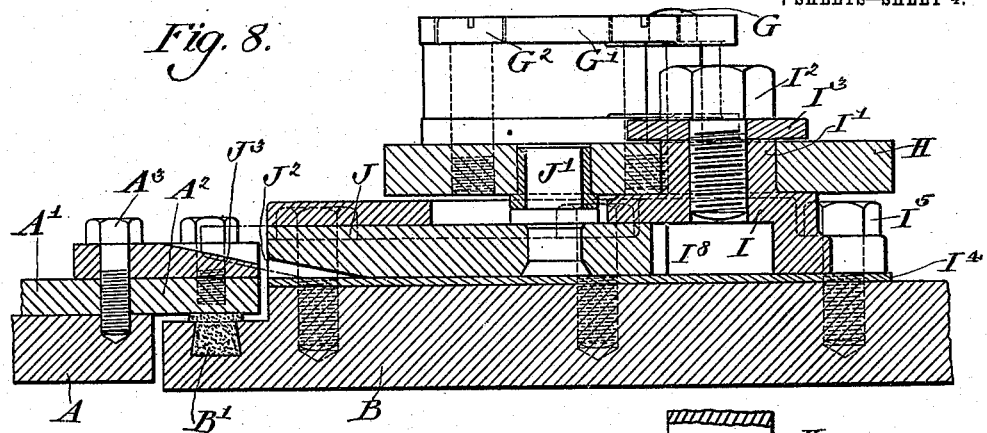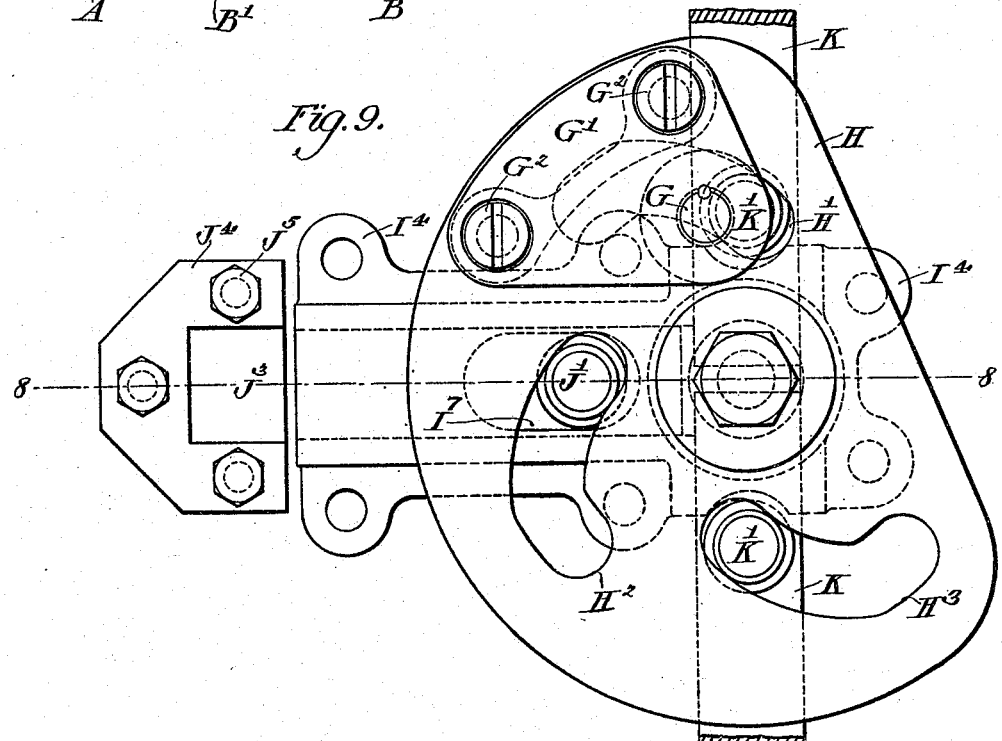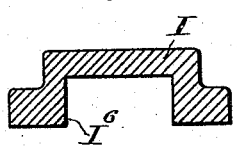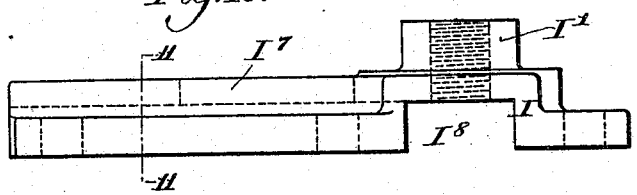

L. D. LOVEKIN, P. M. YOUNG & H. KRAPP.
HATCH COVER AND OPERATING MEANS THEREFOR.
APPLICATION FILED AUG. 31, 1906. RENEWED OCT. 12, 1909.
941,526.
Patented Nov. 30, 1909.
7 SHEETS—SHEET 5.
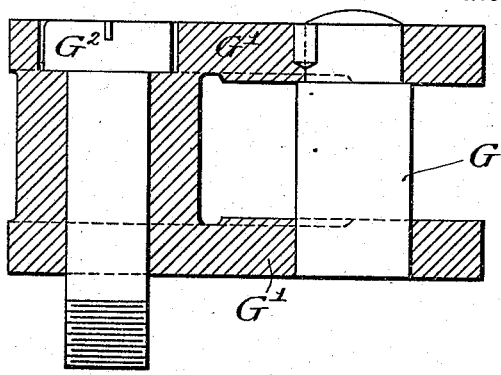
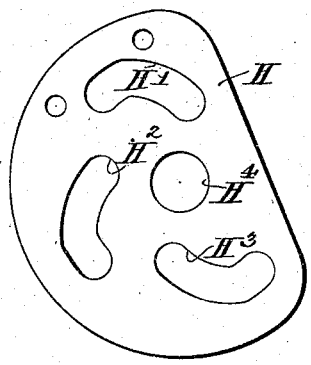
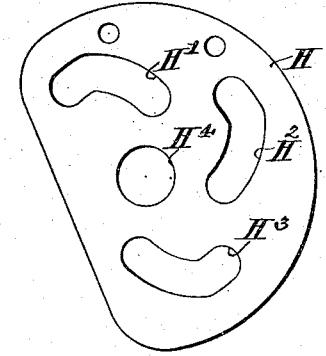
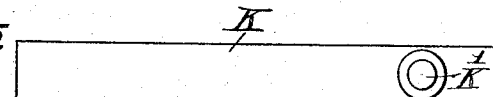
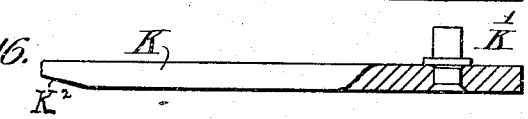
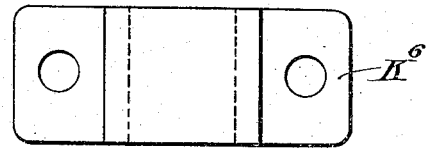
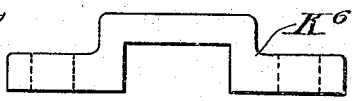
WITNESSES:
INVENTORS:
Luther D. Lovekin, Philip M. Young
and Hugo Krapp
by
ATTORNEY.

L. D. LOVEKIN, P. M. YOUNG & H. KRAPP.
HATCH COVER AND OPERATING MEANS THEREFOR.
APPLICATION FILED AUG. 31, 1906. RENEWED OCT. 12, 1909.
941,526.
Patented Nov. 30, 1909.
7 SHEETS—SHEET 6.
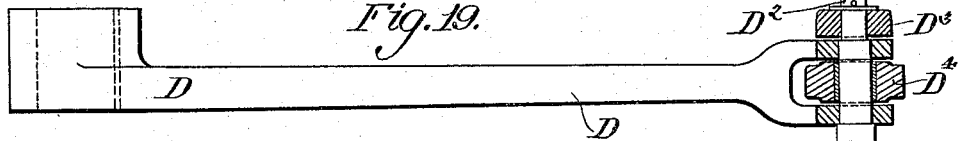
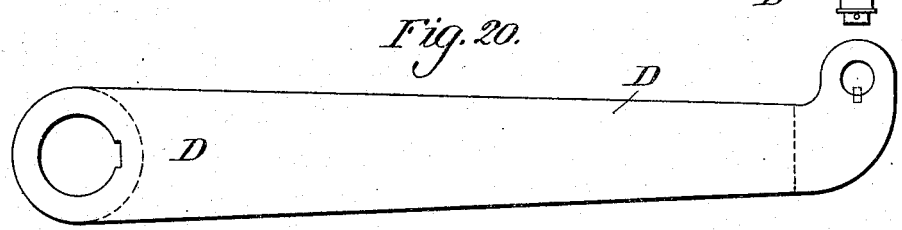
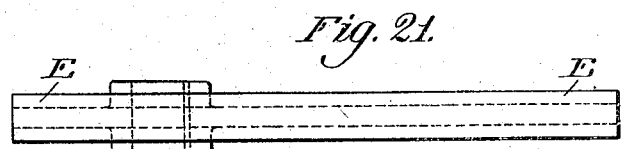
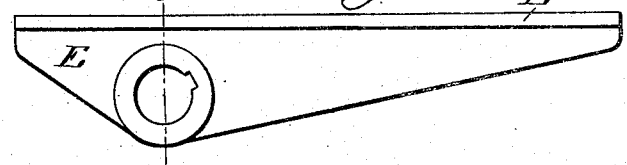
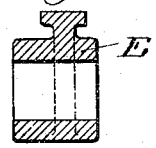
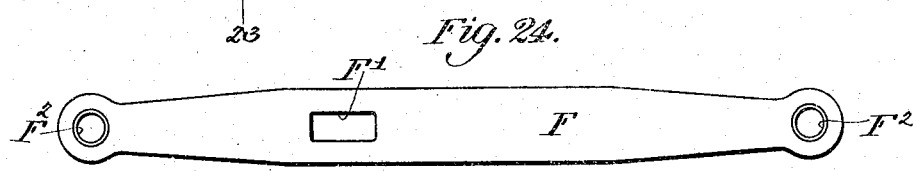
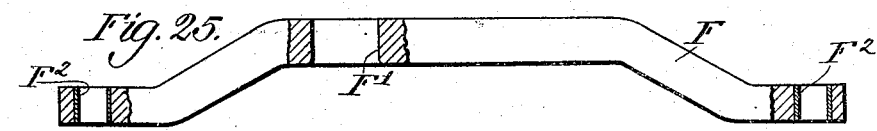
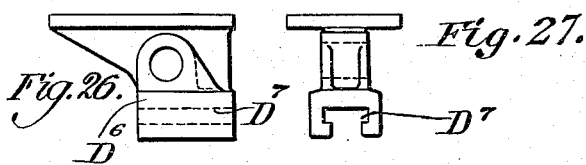
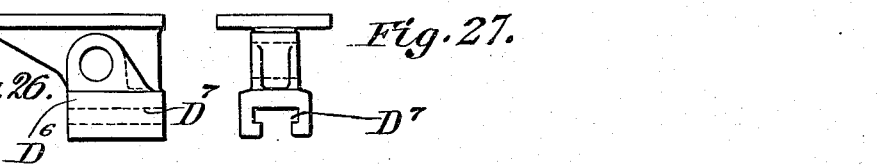
WITNESSES:
INVENTORS:
Luther D. Lovekin, Philip M. Young
and Hugo Krapp
by Francis T. Chambers
ATTORNEY.

L. D. LOVEKIN, P. M. YOUNG & H. KRAPP.
HATCH COVER AND OPERATING MEANS THEREFOR.
APPLICATION FILED AUG. 31, 1906. RENEWED OCT. 12, 1909.
941,526.
Patented Nov. 30, 1909.
7 SHEETS—SHEET 7.
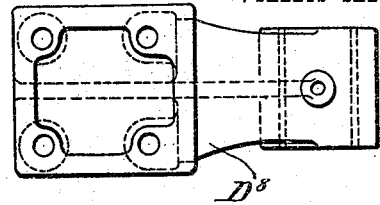
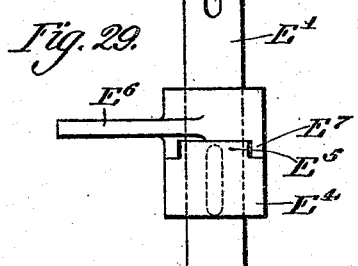
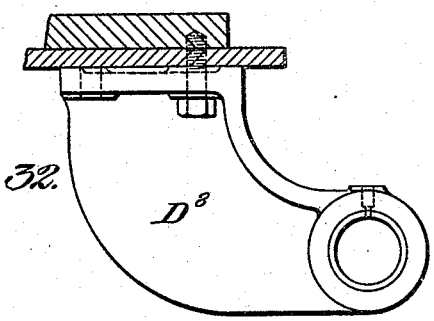
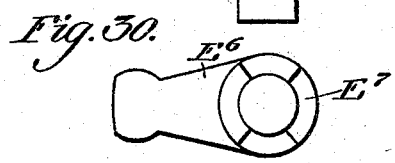
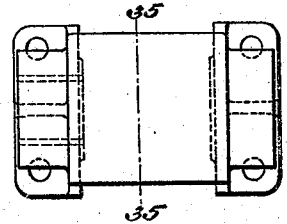
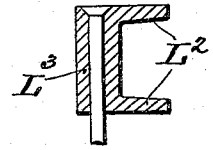
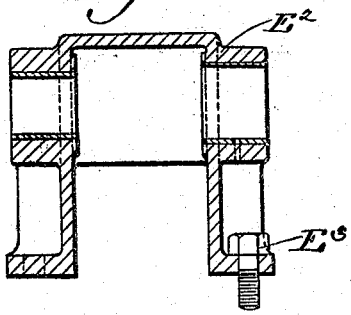
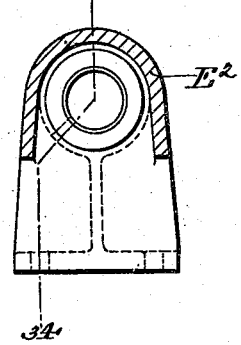
WITNESSES:
INVENTORS:
Luther D. Lovekin, Philip M. Young
and Hugo Krapp
by
ATTORNEY.

UNITED STATES PATENT OFFICE.

LUTHER D. LOVEKIN AND PHILIP M. YOUNG, OF PHILADELPHIA, AND HUGO KRAPP, OF READING, PENNSYLVANIA.

HATCH-COVER AND OPERATING MEANS THEREFOR.

941,526.  Specification of Letters Patent.  Patented Nov. 30, 1909.

Application filed August 31, 1906, Serial No. 332,868.  Renewed October 12, 1909.  Serial No. 522,330.

*To all whom it may concern:*

Be it known that we, LUTHER D. LOVEKIN and PHILIP M. YOUNG, both residents of Philadelphia, in the county of Philadelphia and State of Pennsylvania, and citizens of the United States, and HUGO KRAPP, a resident of Reading, in the county of Berks, in said State of Pennsylvania, and a subject of the Emperor of Germany, have invented a certain new and useful Improvement in Hatch-Covers and Operating Means Therefor, of which the following is a true and exact description, reference being had to the accompanying drawings, which form a part thereof.

Our present invention, while adapted in some of its aspects to doors and their operating mechanism for general use, is primarily adapted for opening and closing hatchways of vessels and particularly for operating the heavy hatch covers of armored war vessels.

The object of our invention is the provision of suitable mechanism for rapidly opening and closing hatchways and for automatically locking the hatch covers in the closed position.

The mechanism we have provided is adapted to be operated by hand or some suitable motor; preferably we provide an electric motor for normally opening and closing the hatch cover, and combine with it connections by which the hatch cover may be manually opened or closed. When we employ an electric motor for opening and closing the hatch door we preferably arrange for what practically amounts to a certain lost motion between the motor and the hatch cover whereby the motor may be speeded up before starting to move the hatch cover from the closed position. We also arrange the hatch cover operating mechanism so that while the motor is always operatively connected to the cover operating mechanism, yet it may make a few turns, more or less, after the hatch cover is carried to the closed position and locked, so that such a nice adjustment of parts is not required as would be if it were necessary that the motor should stop at the instant at which the door is locked home.

Another object of our invention is to arrange the hatch cover operating mechanism so that a minimum of fitting is necessary on ship-board, many of the parts being fitted to the hatch cover before the latter is installed in the ship.

The various features of novelty which characterize our invention are pointed out with particularity in the claims annexed to and forming a part of this specification. For a better understanding of our invention, however, and the advantages possessed by it, reference may be had to the accompanying drawings and descriptive matter in which we have illustrated and described one of the forms in which our invention may be embodied.

In the drawings, Figure 1 is a plan view of the upper side of a deck provided with our hatch cover and operating mechanism therefor. Fig. 2 is a sectional elevation on the line 2—2 of Fig. 1, some parts being shown in the different positions occupied by them at various stages in the operation of the mechanism. Fig. 3 is an elevation, with parts broken away and in section, of the motor and gearing connecting it to the main operating shaft of the mechanism. Fig. 4 is a sectional elevation of the gear casing on the line 4—4 of Fig. 3. Fig. 5 is a similar view on the line 5—5 of Fig. 3. Fig. 6 is a section on the line 6—6 of Fig. 3 and Fig. 7 is an enlarged section on the line 7—7 of Fig. 3. Fig. 8 is a section on the line 8—8 of Fig. 9. Fig. 9 is a plan inverted with respect to Fig. 1 and on a larger scale showing details of the door locking mechanism. Fig. 10 is an elevation of a part of the locking mechanism. Fig. 11 is a section on the line 11—11 of Fig. 10. Fig. 12 is a sectional elevation of a portion of the locking cam plate operating apparatus. Figs. 13 and 14 are plan views of the locking cam plates showing them in the relative positions in which they are assembled. Fig. 15 is a plan view of one of the bolts, and Fig. 16 is an elevation partly in section of the same bolt. Fig. 17 is a plan view, and Fig. 18 an elevation of one of the keepers for the locking bolts. Fig. 19 is a plan view, partly in section, and Fig. 20 an elevation of the main door operating lever or arm. Fig. 21 is a plan view, and Fig. 22 an elevation of the lock operating lever. Fig. 23 is a section on the line 23—23 of Fig. 22. Fig. 24 is a plan view and Fig. 25 an elevation partly in section of the main sliding lock operating member. Fig. 26 is a side elevation, and Fig. 27 an end elevation of the member connecting the main and lock operating levers. Fig. 28 is a plan view of the clutch member secured to the shaft of the lock operating lever. Fig. 29 is an elevation of the lock operating lever shaft and clutch members carried by it. Fig. 30 is an elevation of the clutch member loosely mounted on the shaft. Fig. 31 is a plan, and Fig. 32 an elevation of a bracket in which the main lever operating shaft is journaled. Fig. 33 is a plan of the support for the lock lever shaft. Fig. 34 is a section on the line 34—34 of Fig. 35, and Fig. 35 is a section on the line 35—35 of Fig. 33. Fig. 36 is a section of the door carried guide on the line 36—36 of Fig. 1.

In the drawings, A represents the main frame, deck, or the like in which is formed an opening adapted to be closed by the door B. As is shown, the frame or deck A comprises a main upper part and an under layer, $A^1$. At the doorway the member $A^1$ is extended to form a flange portion $A^2$. The door B, which, when the hatchway of an armored vessel may be made of nickel steel or the like, is hinged to the frame A by a pair of hinge members C, secured, in the form shown, to the upper sides of the door and frame. Packing $B^1$ carried by the door may be employed to make a water-tight connection between the door and flange portion $A^2$.

The main door operating lever or arm D is keyed to a shaft $D^1$ which extends parallel to the axes of the hinges C and projects across the hatchway at one corner thereof, adjacent the hinged edge thereof. The shaft $D^1$ has one end journaled in a bracket $D^8$ secured to the under side of the main frame A. The arm D, which extends substantially parallel to the door B has its end remote from the shaft $D^1$ bifurcated, the forked portions having secured in them a shaft $D^2$ which extends parallel to the shaft $D^1$ (see Fig. 19). The shaft $D^2$ has loosely mounted on it between the bifurcations a door engaging roll $D^4$. One end of the shaft $D^2$ has loosely journaled upon it a guide engaging roller $D^3$. The other end $D^5$ of the shaft $D^2$ has pivotally mounted upon it the lock lever engaging member $D^6$.

The member $D^6$ (see Figs. 26 and 27), has formed in it an under cut slot $D^7$ which extends transversely to the passage formed in it to receive the end $D^5$ of the shaft $D^2$. The slot $D^7$ slidingly receives the flanged upper edge of the lock operating lever E. The lever E is secured to a shaft $E^1$ journaled in a bracket or support $E^2$ secured to the under side of the door B by bolts $E^3$. The construction of the shaft $E^1$, its support, and the parts carried by it are best seen by reference to Figs. 28, 29, 30, 33, 34 and 35. The shaft $E^1$ has secured to it a collar $E^4$ provided with clutch teeth $E^5$ at one end. The shaft $E^1$ also has loosely mounted upon it an arm $E^6$ having clutch teeth $E^7$ which coöperate with the clutch teeth $E^5$. As shown, there is a certain amount of clearance between the clutch teeth $E^5$ and $E^7$ so that a limited movement of the shaft $E^1$ can take place without a corresponding movement of the arm $E^6$.

The end of the arm $E^6$ remote from the shaft $E^1$ engages in a slot $F^1$ formed in the bolt operating member F. The member F is provided with a body portion which is adjacent the body of the door B. The ends of the member F are bent away from the body of the door and are provided with apertures $F^2$. The apertures $F^2$ receive shafts G carried by members $G^1$ secured to the under sides of the lock operating cam plates H and $H^a$. Each of the cam plates is journaled on the boss $I^1$ of a corresponding member I secured to the under side of the door. The construction of these parts is shown best in Figs. 8, 9, 10, 11, 12, 13 and 14. Each cam plate is provided with three slots $H^1$, $H^2$ and $H^3$. The plates and the slots formed in them may be identical, as shown. As shown, the left hand ends of the slots of each cam plate with reference to its aperture $H^4$ receiving the boss $I^1$ are curved concentric to said boss, while the right hand ends of the slots are inclined toward the boss. The slots $H^1$ and $H^3$ are diametrically opposite to each other and the slot $H^2$ is practically midway between the slots $H^1$ and $H^3$ at one side of the aperture $H^4$. While the plate H is similar to the plate $H^a$, they are assembled as shown in Fig. 1 so that the slots $H^2$ of the two plates are at opposite sides of the corresponding apertures $H^4$.

A washer $I^3$ secured to the upper end of each boss $I^1$ by a bolt $I^2$ serves to retain the corresponding cam plate H or $H^a$ in place. Apertured ears $I^4$ carried by the members I receive bolts $I^5$ tapped into the door B and serving to hold the members I in place. Each member I is formed with a channel portion $I^6$ in which slides a bolt J. The bolt J has projecting from its upper surface a stud $J^1$ which enters the slot $H^2$ of the corresponding cam plate. Each member I is provided with a passage $I^8$ extending parallel to the shaft $D^1$ and receiving the inner ends of a pair of transversely extending locking bolts K. Each locking bolt K, shown best in Figs. 9, 15 and 16, carries a stud $K^1$ which is received in the corresponding slot $H^1$ or $H^3$ of the proper cam plate. When the cam plates are oscillated about their supporting bosses, the bolts J and K are moved inward and outward by engagement of the studs $J^1$ and $K^1$ with the walls of the left hand ends of the corresponding slots in the cam plates. When the studs are in the portions of the slots concentric with the boss receiving apertures $H^4$ of the cam plates, rotative movements of the cam plates produce no corresponding movements of the bolts.

The outer ends of the bolts J and K adjacent the door are beveled as indicated at $J^2$ and $K^2$ to facilitate their engagement with the inclined surface $J^3$ of member $J^4$ and a corresponding surface of member $K^4$ respectively, secured to the deck or frame A by bolts $J^5$ and $K^5$. This arrangement also forms means for wedging the door home to make a water-tight joint between it and the deck. Keepers $K^6$ secured to the door B guide the outer ends of the bolts K.

A guide member L extending transversely to the hinged edge of the door B is secured to the latter by means of bolts $L^1$ screwing into ears $L^3$. The guide member L is provided with flanges $L^2$ extending parallel to the face of the door. The channel between the flanges forms a guideway to receive the roll $D^3$. When the lever D is in the position shown in Fig. 1, the roll $D^3$ is beyond the corresponding end of the guide L. When the roll $D^4$ engages the under surface of the door B, as shown in the full line position of Fig. 2, the roll is about in position to enter the passage, and as the arm D is turned to lift the door out of the closed position, the roll $D^3$ is moved under the overhanging guide formed by the flange $L^2$ remote from the door. On account of the lateral displacement of the shaft $D^1$ from the hinge axis of the door, the roll $D^3$ cannot thereafter pass out of the guideway in the guide L until the door is returned to the closed position. At all times therefore when the door is out of the closed position the end of the lever remote from the shaft $D^1$ is operatively secured to the door and controls the movement of the latter about its hinge axis.

The operation of the mechanism so far described is as follows: Assuming the door to be in the closed position shown in Fig. 1 and in full lines in Fig. 2 with the door locked in position, the lever D will be in the right hand dotted line position of Fig. 2, and will have its free end remote from the door. The first movement of the shaft $D^1$ carries the arm D from the initial dotted line position to the position shown in full lines in Fig. 2. As the free end of the lever D approaches the door, the lever E and its shaft are oscillated by the member $D^6$ carried by the shaft $D^2$ and engaging the flanged edge of the lever E. The rotative movement of the locking lever shaft $E^1$ produced in this manner after more or less initial movement to take up the lost motion between the clutch teeth $E^7$ and $E^5$, produces a turning movement of the member $E^6$. This, through its engagement with the slot $F^1$ in the sliding lock member F reciprocates the latter. The reciprocation of the member F by its engagement with the stud G of the member $G^1$ turns the members H about their pivotal supports. The oscillation of the members H and $H^a$ causes the bolts J and K to be withdrawn from the position in which they engage the members $J^4$ and $K^4$ to the position in which they clear the inner edges of the opening in the frame or deck A. We have before pointed out that the movement of the cam plates while the bolt studs are in the portions of the slots in the cam plates concentric with the axes of the plates produces no movement of the bolts. It will be observed that with this construction the first movement of the shaft $D^1$ is without operative effect on the mechanism except to take up the lost motion between the clutch $E^5$ and $E^7$. Subsequent movement causes a reciprocation of the lever F and oscillation of the cam plates without at first producing movement of the bolts. As a result, the electric motor or other driving device can run up to speed before any considerable load is put upon it. After the bolts are withdrawn, the lever D through the roller member $D^4$ which is in engagement with the under side of the door, lifts the door out of the closed position. As the door leaves the closed position, the roll $D^3$ enters the passageway $L^2$ and thereafter separation of the lever from the door is prevented until the door returns to the closed position. The turning movement of the shaft $D^1$ and arm D is continued to open the hatchway to the desired position, the normal open position being indicated in dotted lines in Fig. 2. When it is desired to close the door, the cycle of operations is repeated. The door of course begins to turn with the initial backward movement of the shaft $D^1$, but this is no disadvantage since the load on the motor in making the initial closing movement is relatively small. When the door or hatch cover is in the open position the arm D extends through the hatchway at one corner. Except for the arm D and the shaft $D^1$ the passageway is unobstructed, and these members only obstruct a small portion of the passageway.

It will be understood that the mechanism hereinbefore described can practically all be secured to the door before the latter is assembled in the deck. This is a matter of much importance particularly where the door is intended for use as a hatch cover, since it is a more or less difficult matter to carry on the fitting operations in the limited space available on ship-board.

In the form of our invention disclosed, in Fig. 3, the end of the shaft $D^1$ remote from the lever D has keyed to it a gear segment $L^5$, which is located within a casing M, the upper end of which is secured against the deck or frame A. The lower end of the casing M is closed by a casing member $M^1$.

Bearings $M^2$ are supported by the casing members M and $M^1$ in which is journaled a shaft N having a worm portion $N^1$ which engages with teeth on the segment $L^5$. Thrust washers $N^2$ are located between the ends of the worm $N^1$ and the adjacent ends of the bearings $M^2$. One end of the shaft N extends through the casing and has secured to it a wheel $N^3$. The other end of the shaft, which is located within the casing, carries a gear wheel $N^4$ which meshes with the teeth on a gear $O^1$ journaled on the shaft O journaled in the casing. The gear O has a projecting hub portion $O^2$ upon which is keyed a large gear $O^3$, the teeth of which mesh with the teeth of a gear wheel $P^1$ keyed on the end of an armature shaft P of an electric motor Q secured to portions $M^3$ of the casing member M. As shown, the shaft P projects through the casing M, the portion of the shaft carrying the gear wheel $P^1$ being located within the casing proper. The motor and the casing formed by the casing members M and $M^1$ are preferably water-tight. The lower end of the casing in which the segment $L^5$ and worm $N^1$ are located may form a receptacle for oil lubricating the gearing and bearings located within the casing. Manual actuation of the door operating mechanism is possible by means of a belt or chain driving member which connects the wheel or pulley $N^4$ with the wheel or pulley $N^5$ carried by a shaft R journaled in brackets $R^1$ and $R^2$ secured to the framework of the ship or other structure in which our invention is employed. The shaft R carries a bevel gear $R^3$ which meshes with a bevel gear $R^4$ carried by a shaft S. The opposite end of the shaft S carries a bevel gear $S^3$ and a wheel $S^5$. The gear wheel $S^3$ meshes with a bevel gear T having a square aperture $T^1$ to receive the squared end of a shaft operating member $T^2$. The shaft S may be operated either through the key or shaft $T^2$ or the wheel $S^2$. It will thus be observed in the mechanism described the door may be operated either by the motor or manually without any disconnection or alteration of parts.

While we have hereinbefore described and illustrated the best form of our invention now known to us it will be obvious to those skilled in the art that changes may be made in the form of our invention without departing from its spirit, and we do not wish the claims hereinafter made to be limited to the particular embodiment herein described more than is made necessary by the state of the art.

Having now described our invention, what we claim as new and desire to secure by Letters Patent is,

1. In combination, a door member hinged to turn about an axis, an operating member hinged to turn about an axis out of line with the hinged axis of the door, one of said members being provided with an under-cut passage and the other with a portion for entering said passage, means for turning said operating member about its axis to engage the door and move it out of its closed position, said passage and portion being arranged so that such movement causes the portion to enter said passage whereby the two members are operatively connected together, and the arm is maintained close to the door member while the door is out of the closed position.

2. In combination, a frame, a door member hinged thereto to turn about an axis, an operating member also hinged to the frame to turn about an axis out of line with the hinge axis of the door, means for moving said operating member against the door to move the latter out of its closed position and means for operatively connecting said members together when the door is out of its closed position, comprising an under-cut guideway provided in one of said members and a projection carried by the other of said members, and moved into said guideway by the relative movement of the members occurring when the door member is moved out of the closed position by the operating member.

3. In combination, a door frame, a door hinged to one side of said frame, a door operating arm hinged to the other side of said frame, mechanism for locking the door in its closed position, a connection between said mechanism and said arm, means for moving the arm away from the door when the latter is in its closed position to lock the door in place, and for moving the arm in the opposite direction to unlock the door and for continuing said movement to open the door and means for preventing separation of the arm and door when the latter is out of the closed position, comprising a guide secured to the door and having an undercut guideway in it and a projection carried by the arm and moved into said undercut guideway by the relative movements between the arm and door as the latter is moved out of the closed position.

4. In combination, a door frame, a door hinged to one side of said frame, a door operating arm hinged to the other side of said frame, said arm being movable toward and away from the door when the latter is in its closed position and against the door to move the door out of its closed position, locking mechanism actuated by the movement of the member toward and away from the door in the locking and unlocking directions respectively, and means preventing motion of the arm toward and away from the door when the latter is out of the closed position, comprising an under-cut guide carried by the door and a projection carried by the arm arranged to move under said guide as the arm moves the door out of the closed position.

5. In combination, a door frame, a door hinged thereto to open at one side of the frame, an operating arm pivotally supported at the opposite side of the frame on an axis parallel to but laterally displaced from the hinge axis of the door, a lock actuating lever hinged to the door, a sliding connection between said arm and said lever, said arm being movable toward and away from the door when the latter is in the closed position to actuate the locking lever in its unlocking and locking directions respectively and against the door to move the latter out of its closed position, and means for preventing separation between the arm and the door when the latter is out of its closed position, comprising an overhanging guide carried by the door and a projection carried by the arm, said projection being free of the guide when the door is in its closed position but being carried into said guide as the door is moved out of the closed position by the sliding movement of the door and the arm, due to the lateral displacement of their axes.

6. In combination, a deck having a hatchway, a hatch-cover therefor hinged to the deck to open upwardly, an electric motor supported upon the under side of the deck, a shaft rotated thereby and projecting beneath the hatchway, an arm secured to the shaft and movable through the hatchway to lift the hatch cover out of the closed position, locking mechanism carried by the hatch cover, and a connection between it and the arm whereby movement of the arm away from and toward the door when the latter is in its closed position locks and unlocks the door in place, said connection permitting a certain amount of movement of the arm without a corresponding movement of the locking mechanism.

7. In combination, a support, a door member hinged thereto to turn about an axis, an operating arm hinged to said support to turn about an axis out of line with the hinge axis of the door, a lock lever pivotally secured to the door, and a member pivotally connected to said arm and slidingly connected to said lock lever.

8. In combination, a hatch cover, locking bolts therefor, cam plates for actuating them, a member for actuating the cam plates, a shaft for actuating said member, said shaft and member being connected by means permitting some motion of the shaft without corresponding movement of the member, and an electric motor and connections therefrom for opening and closing the hatch cover and for operating said shaft.

9. In combination, a hatch cover, locking bolts slidingly secured thereto, a cam plate for sliding the bolts pivoted to the cover and connected to the bolts by means permitting some turning movement of the cam without corresponding sliding movements of the bolts, a door operating arm, an electric motor for actuating it and a connection between said arm and the cam for moving the latter.

10. In combination, a support, a door hinged thereto, an operating arm hinged to the door to turn about an axis out of line with the hinge axis of the door and movable toward and away from the door when the latter is in its closed position and against the door to move the latter out of its closed position, locking bolts, a cam member for actuating the bolts, and a member for actuating said cam member all carried by the door, means connecting said arm, and cam actuating member whereby a predetermined movement of the arm toward and away from the door will operate the locking mechanism, said means being arranged to permit a limited movement of the arm without a corresponding movement of the cam, and said cam and bolts being arranged to permit a limited movement of the cam without a corresponding movement of the bolts.

11. In combination, a door, a pair of cam plates pivoted to the door adjacent opposite edges thereof said plates having cam slots formed in them, sliding bolts having projections entering said slots and a member connecting said cam plates having a body portion sliding against the door and upturned end portions pivotally connected to the sides of the cam plates remote from the door, a shaft journaled on the door, and an arm on said shaft engaging said member.

LUTHER D. LOVEKIN.
PHILIP M. YOUNG.
HUGO KRAPP.

Witnesses as to the signature of Luther D. Lovekin:
   R. A. STORKMAN,
   C. B. GROFF,
   B. FRANK FOX.

Witnesses as to the signature of Philip M. Young:
   GEORGE H. EIMERT,
   FRANK S. BEITZEL,
   B. FRANK FOX.

Witnesses to the signature of Hugo Krapp:
   JOHN E. HUBBELL,
   ARNOLD KATZ.